United States Patent [19]
Godfrey

[11] Patent Number: 5,763,516
[45] Date of Patent: Jun. 9, 1998

[54] POLYETHYLENE BASED HOT-MELT ADHESIVE

[75] Inventor: Darryl Aubrey Godfrey, Charlotte, N.C.

[73] Assignee: H.B. Fuller Licensing & Financing, Inc., St. Paul, Minn.

[21] Appl. No.: 639,254

[22] Filed: Apr. 24, 1996

[51] Int. Cl.$^6$ .............. C08L 93/04; C08L 51/06; C08L 57/02; C08K 5/01

[52] U.S. Cl. .......... 524/271; 524/274; 524/487; 524/488; 524/489; 524/499; 524/504; 524/478; 525/210; 525/211; 525/240

[58] Field of Search .............. 524/271, 274, 524/478, 479, 480, 487, 488, 489, 499, 504; 525/210, 211, 240

[56] References Cited

U.S. PATENT DOCUMENTS

| | | | |
|---|---|---|---|
| 3,856,889 | 12/1974 | McConnell | 524/291 |
| 4,127,619 | 11/1978 | Godfrey | 524/489 |
| 4,146,521 | 3/1979 | Godfrey | 524/499 |
| 4,207,220 | 6/1980 | Godfrey | 524/274 |
| 4,471,086 | 9/1984 | Foster | 524/489 |
| 4,568,713 | 2/1986 | Hansen et al. | 524/274 |
| 5,084,534 | 1/1992 | Welborn, Jr. et al. | 526/160 |
| 5,382,615 | 1/1995 | Godfrey | 524/271 |
| 5,441,999 | 8/1995 | Jarvis et al. | 524/271 |

*Primary Examiner*—Peter A. Szekely
*Attorney, Agent, or Firm*—Carolyn A. Fischer; Lisa L. Ryan; Nancy N. Quan

[57] ABSTRACT

Hot-melt adhesive compositions useful for packaging are disclosed. These hot-melt adhesive compositions are based on modified polyethylene and contain a linear, low density copolymer or terpolymer of ethylene and another alpha-olefin, a polyethylene graft copolymer, a tackifying resin, and a high-melting low viscosity wax. The hot-melt adhesive compositions disclosed herein produce very good adhesive bonds, even at high speed packaging conditions under a broad range of ambient packaging temperatures. These inventive adhesive compositions have a novel combination of good hot tack and good adhesive bond properties, even at extreme conditions.

34 Claims, No Drawings

POLYETHYLENE BASED HOT-MELT ADHESIVE

FIELD OF THE INVENTION

The present invention relates to modified polyethylene-based hot-melt adhesives. More particularly, the present invention relates to a hot-melt adhesive composition containing an ethylene-alpha olefin copolymer or terpolymer and a modified polyethylene, having a novel combination of properties including good hot tack.

BACKGROUND OF THE INVENTION

Hot-melt adhesives are widely used in industry for various packaging applications. Over time, packaging processes and equipment have improved, increasing the packaging speed. High speed packaging applications have become more demanding for hot melt adhesives to follow along with the improvements of other packaging factors. Many packaging applications have characteristics that are very demanding on adhesives, requiring the adhesive to have fast set time, good bond aging characteristics, and high bond strength at both high and low temperatures. Some of the most demanding packaging applications require that the adhesive adhere satisfactorily to a variety of packaging substrates that are at ambient temperatures of 2° to 43° C. (35° to 110° F.).

One of the most challenging packaging substrates for which high performance adhesives are needed is the high recycle content, high performance corrugated board stock used in multipiece construction for high spring back boxes. The high spring back force of this type of box enables the filling of a box with a product which somewhat temporarily alters the shape of the box due to the weight of the product. This type of box is especially useful for packaging heavy meat products such as unprocessed beef and pork. The high performance corrugated board stock is flexible enough to sag and bulge under such weight while maintaining its packaging integrity. However, to efficiently utilize the high spring back force in such boxes during the high speed packaging of products, it is necessary that the adhesive which holds the multiple pieces of the box together have good hot tack. Hot tack is the property of an adhesive that allows it to accept a load before the adhesive cools below its softening point, while remaining adhered to the substrate. Hot tack can be measured by determining the time that would be expected to result in the bonds of 50 percent of all 25 mg/cm bead specimens of adhesive to fail. A hot tack rating of 0.45 seconds or less is good. Further details regarding hot tack analysis are provided in the Examples below. Using an adhesive with poor hot tack results in either weak bonds from where the adhesive stretches under the load or a forced delay, allowing the adhesive to properly set. An adhesive having both good hot tack and short set time would be very useful in high speed packaging of high spring back boxes, as long as the other adhesive properties remained acceptable.

Some ethylene-vinyl acetate based adhesives currently have good hot tack and excellent low temperature properties. However, these existing adhesives have poor elevated temperature properties. For example, a box sealed with one existing ethylene-vinyl acetate based adhesive having good hot tack may maintain good adhesive bonding at a packaging temperature of 2° C. yet exhibit poor adhesive bonding at a ambient packaging temperature of 38° C.

In the industry, it has not been possible to formulate a hot-melt adhesive composition having good to excellent hot tack as well as a good combination of the other adhesive properties important for high speed packaging in a broad temperature range. Polyethylene and modified polyethylene based adhesives tend to have excellent elevated temperature properties. Whereas ethylene-vinyl acetate copolymers are commonly used for their excellent low temperature properties. U.S. Pat. No. 5,382,615 discloses a hot-melt adhesive composition containing a copolymer of ethylene and alkyl acrylate or alkyl methacrylate, a polyethylene graft copolymer, a tackifying resin, and a high-melting low viscosity wax. The composition of U.S. Pat. No. 5,382,615 has a relatively good combination of properties with good high and low temperature bond strength, but does not show good hot tack.

Several adhesive properties are known to improve with the addition of higher levels of tackifier to an adhesive composition. Among them are adhesion (surface wetting) and open time. Open time is the maximum time that a particular adhesive has between the time it is deposited and then contacted with another substrate to form an acceptable bond. However, the amount of tackifier added to a composition is limited by the high glass transition temperatures of tackifiers. Generally, the addition of high amounts of tackifier to a composition which has otherwise good adhesive properties would cause the composition to become brittle and lose low temperature bonding properties.

Since typical packaging adhesives perform best in specific ambient temperature ranges, encountering different ambient temperature ranges during the packaging process tends to diminish some essential performance properties, such as hot tack, set time, and open time. Producers in the packaging industry, especially those employing high speed packaging, are often required to choose the adhesive properties that are most critical for a particular application at a particular ambient packaging temperature and which adhesive properties can be sacrificed.

In light of the above, it would be very desirable to be able to produce a hot melt adhesive composition that performs well under a broad range of ambient packaging temperatures and has good hot tack. More particularly, it would be very desirable if this adhesive composition exhibited good high and low temperature bond strength, hot tack, set time, open time, and bond aging characteristics in high speed packaging of multipiece boxes.

SUMMARY OF THE INVENTION

The hot-melt adhesive composition according to the present invention comprises a blend of:

(a) about 3 to 50 weight percent of a linear copolymer of ethylene and at least one other alpha-olefin having from 3 to 12 carbon atoms, the copolymer having a density of less than about 0.915 g/cc and a melt index of about 70 to 1,000 g/10 min at 190° C.;

(b) about 5 to 80 weight percent of a polyethylene graft copolymer having a saponification number of about 3 to 60 that is grafted with an unsaturated polycarboxylic acid, anhydride, or ester thereof;

(c) about 15 to 45 weight percent of a tackifying resin selected from the group consisting of essentially aliphatic hydrocarbon resins, polyterpene resins, and rosin ester resins; and (d) about 5 to 20 weight percent of a high melting, low viscosity wax selected from the group consisting of high density polyethylene waxes, Fischer-Tropsch synthetic waxes, and microcrystalline waxes, wherein the composition has a melt viscosity of about 300 to 4,000 centipoise at 177° C. (350° F.).

DETAILED DESCRIPTION OF THE INVENTION

The applicant has unexpectedly discovered an improved hot-melt adhesive composition for high-speed packaging applications that has a novel combination of desirable properties heretofore unattainable from a polyolefin based hot-melt adhesive.

The applicant was surprised to find that the presence of component (a), a very low crystalline, linear, low density ethylene copolymer in the adhesive blend enhanced some of the adhesive properties of a polyethylene based adhesive composition by it's mere presence in the composition. The applicant was even more surprised to find that the presence of this low crystalline, linear, low density copolymer in the present adhesive compositions permitted more formulating latitude with the other components than was achievable using standard ethylene-based homopolymers and copolymers, permitting the addition of greater amounts of the other formulation components, especially the tackifying resin, than could ever be used before without sacrificing flexibility, low temperature properties, and bond aging.

The present hot-melt adhesive composition has a novel combination of good hot tack and a very good balance of all of the other properties which are important for high speed packaging over a broad range of packaging temperatures. The present hot-melt adhesive composition preferably has a combination of good hot tack, set time, open time, high temperature bonding performance, low temperature bonding performance, and bond aging characteristics.

The hot-melt adhesive composition according to the present invention contains about 3 to 50 weight percent of component (a), a very low crystalline, linear, low density ethylene copolymer or terpolymer, with at least one other alpha-olefin having from 3 to 12 carbon atoms. The term "copolymer" will hereinafter be used to refer to copolymers, terpolymers and any combination thereof, for convenience.

The ethylene copolymer of the present invention is present in a concentration of about 3 to 50 weight percent, preferably about 3 to 30 weight percent, more preferably about 5 to 20 weight percent, even more preferably 10 to 20 weight percent, with a weight percent of about 11 to 17 being most preferred. Amounts of the ethylene copolymer much below about 3 weight percent produce a less desirable blend composition, one that does not exhibit the most desirable combination of low temperature properties and open time when formulated for good hot tack and fast set. Amounts of the ethylene copolymer much over about 50 weight percent result in compositions having undesirably high viscosities.

The other alpha olefin or olefins present in the ethylene copolymer can have 3 to 12 carbons, preferably 3 to 8 carbons, and more preferably 4 to 6 carbons. 1-Butene and 1-hexene are the most preferred alpha olefin comonomers.

The amount of the other alpha olefin in the ethylene copolymer varies from about 8 to 30 weight percent. The amount of this other alpha olefin is preferably about 15 to 25 weight percent, with a weight percent of about 21 to 23 being most preferred. Amounts of the other alpha olefin in the copolymer much below about 8 weight percent would produce an ethylene copolymer that is too crystalline in nature and would not have good low temperature properties or bond aging characteristics whereas amounts much above 30 weight percent would produce a material that is too soft, rubbery and tacky and would be hard to pelletize.

The ethylene copolymer used in the hot-melt adhesive composition of the present invention has a melt index of about 70 to 1,000 g/10 min at 190° C., as determined by ASTM test method D-1238. The melt index of the ethylene copolymer is preferably about 100 to 500 g/10 min, with a melt index of about 300 g/10 min being most preferred. The use of an ethylene copolymer having a melt index much below 70 would produce a hot-melt adhesive that would be too high in viscosity for effective use in high speed packaging. An ethylene alpha-olefin copolymer having a melt index much greater than 1,000 would produce a hot melt adhesive having long set times, poor elevated temperature properties, and lower cohesive strength.

The ethylene copolymer has a density less than about 0.915 g/cc, preferably less than 0.91 g/cc with a density less than 0.90 g/cc being most preferred.

The ethylene copolymer of the present invention has a very narrow molecular weight distribution with a polydispersity index of less than 2.5, preferably less than 2.3, more preferably 2.0 or less. The polydispersity index is calculated as the weight average molecular weight (MW), as measured by gel permeation chromatography, divided by the number average molecular weight (MN), as also measured by gel permeation chromatography.

Currently, the ethylene-alpha olefin copolymers known to have these properties are those which have been polymerized in the presence of a metallocene catalyst, as described in U.S. Pat. No. 5,084,534, the disclosure of which is incorporated herein by reference in its entirety. Ethylene copolymers of such low density and low crystallinity are known as plastomers. Metallocene catalyzed linear low density polyethylene plastomers were mainly developed, and have heretofore been mainly used, for improving the toughness and flexibility of films. Metallocene catalysts are known as single site catalysts. These catalysts have only one reactive site and can produce copolymers of ethylene and other alpha-olefins that have only short chain branches, thereby forming an essentially linear copolymer having a very narrow molecular weight distribution. The linearity provides high tensile strength to the ethylene copolymer. The branching provides for lower density and crystallinity. The catalyst also provides excellent uniform comonomer incorporation into the polymer chain. However, it is the ethylene copolymer itself, not the method of producing the ethylene copolymer, that is critical to the present adhesive compound.

A polymer catalyzed by a single-site metallocene catalyst should have a very narrow molecular weight distribution, having a polydispersity index of less than about 2.5. This is distinguishable from a polymer catalyzed by a multi-site Ziegler type catalyst which typically has polydispersity index of about 3 to 6, and a polymer catalyzed by a peroxide catalyst which typically has a polydispersity index of about 2.8 to 4.6.

Suitable metallocene catalyzed copolymers of ethylene and alpha olefin include plastomeric copolymers and terpolymers of ethylene and alpha olefins having from three to twelve carbons. A copolymer of ethylene and 1-butene is preferred. A particularly suitable example of ethylene-1-butene copolymer is available from Exxon Chemical Company as Exxon Exact 4038, having about 22 weight percent 1-butene, a melt index of about 125 and a density of about 0.885 g/cc.

The hot-melt adhesive composition according to the present invention contains about 5 to 77 weight percent of component (b), a polyethylene graft copolymer having a saponification number of about 3 to 60 that is grafted with an unsaturated polycarboxylic acid, anhydride, or ester thereof. The amount of this polyethylene graft copolymer is preferably about 15 to 70 weight percent, more preferably about 25 to 55 weight percent, even more preferably about 25 to 45 weight percent, with a weight percent of about 30 to 45 being most preferred. Amounts of this polyethylene graft copolymer much below 5 weight percent produce an adhesive that exhibits shorter open time and poorer elevated temperature properties. Additionally, since the polyethylene graft copolymer is the less expensive component in the present composition, an adhesive with lower amounts of the polyethylene graft copolymer would be more expensive. Amounts of the polyethylene graft copolymer can be as high as 80 weight percent with a resulting slight reduction in the other components. However, amounts much above 77 and over 80 weight percent would produce an adhesive that does not have adequate low temperature properties, set time, open time or hot tack.

The process of producing this polyethylene graft copolymer is well known in the art, as for example the process disclosed in U.S. Pat. No. 3,856,889, the disclosure of which is incorporated herein by reference in its entirety. The polyethylene used to produce the polyethylene graft copolymer can be low molecular weight or degraded polyethylene. The polyethylene graft copolymer has been reacted to such an extent that the saponification number is about 3 to 60, preferably about 3 to 10, more preferably about 3 to 7 with a saponification number of about 5 being most preferred. A saponification number much below 3 does not provide a significant amount of modification to the polyethylene to be useful in the blends of the present adhesive composition whereas a saponification number much above 60 is not practical because of poor melt stability, higher color, and higher odor.

The polyethylene graft copolymer used in the adhesive composition of the present invention preferably has a viscosity of about 350 to 15,000 centipoise at 150° C., more preferably about 2,000 to 8,000 centipoise at 150° C., with a viscosity of about 4,000 centipoise at 150° C. being most preferred. Polyethylene graft copolymers having a viscosity much below about 350 centipoise at 150° C. produce adhesives with lower cohesive strength whereas polyethylene graft copolymers having a viscosity much above 15,000 centipoise at 150° C. produce adhesives with viscosities that are higher than desirable for packaging applications.

The polyethylene graft copolymer used in the adhesive composition of the present invention preferably has a melt index of about 100 to 5,000 g/10 min at 190° C., more preferably about 1,000 to 5,000 g/10 min at 190° C., with a melt index of about 2,000 to 4,000 g/10 min at 190° C. being most preferred. A polyethylene graft copolymer with a melt index much below about 100 g/10 min is not very practical since the viscosity of the resulting adhesive would be higher than desirable for high speed packaging applications, whereas a polyethylene graft copolymer with a melt index much above 5,000 g/10 min at 190° C. is impractical to accurately measure.

The polyethylene graft copolymer of the adhesive composition of the present invention preferably has a density of about 0.89 to 0.93 g/cc, more preferably about 0.905 g/cc. The polyethylene graft copolymer preferably has a ring and ball softening point of about 85° to 120° C., with a ring and ball softening point of about 102° C. being more preferred.

Examples of suitable unsaturated polycarboxylic acids, anhydrides or esters thereof that can be reacted with polyethylene to produce component (b) include maleic acid, fumaric acid, and citraconic anhydride and are disclosed in U.S. Pat. No. 3,856,889 the disclosure of which is incorporated herein by reference in its entirety. A particularly suitable example of a polyethylene graft copolymer is a maleated polyethylene available from Eastman Chemical Company as Epolene C-18 having a saponification number of about 5, a viscosity of about 4,000 centipoise at 150° C., a density of about 0.905 g/cc, and a ring and ball softening point of about 102° C. Epolene C-18 is polymerized under high pressure using a peroxide catalyst which provides for a molecular weight distribution of about 2.6 to 4.6. The resulting polyethylene is then grafted with maleic anhydride.

The amount of component (c), the tackifying resin, used in the hot-melt adhesive composition of the present invention is about 15 to 45 weight percent, preferably about 20 to 40, more preferably 20 to 35, with a weight percent of about 30 to 35 being most preferred. Amounts of tackifying resin much below about 15 weight percent do not produce a hot-melt adhesive that has good hot tack, open time or good bond characteristics after application, whereas amounts much above 45 weight percent produce a hot-melt adhesive that has poor bond aging and poor low temperature properties.

The applicant has found that hot tack is affected, at least in part, by the total amount of tackifier and wax, as well as their relative proportions in the blend. Hot tack has been found to improve with increased amounts of tackifier. The particular tackifier and wax used also have a significant affect on hot tack.

The tackifying resin used in the hot-melt adhesive composition according to the present invention is selected from the group consisting of essentially aliphatic hydrocarbon resins (those having less than 10% aromatic content, preferably less than 5%, and more preferably less than 1% aromatic content), polyterpene resins, and rosin ester resins. Suitable hydrocarbon resins include DAC-B hydrocarbon resin, available from Eastman Chemical Company, prepared according to the process disclosed in U.S. Pat. No. 4,146,521, as well as other hydrocarbon resins, synthetic polyterpenes, rosin esters, and the like. One particularly suitable hydrocarbon tackifying resin is an essentially aliphatic hydrocarbon resin having a ring and ball softening point of about 130° C., a viscosity of about 1,200 centipoise at 190° C. and a density of about 1.04 g/cc and available commercially from Eastman Chemical Company as Eastotac H-130R. Other hydrocarbon tackifying resins can be prepared by the polymerization of monomers consisting primarily of olefins and diolefins and include, for example, the residual by-product monomers resulting from the manufacture of isoprene. These hydrocarbon tackifying resins typically exhibit a ring and ball softening point of about 75° to 150° C.; an acid number of about 0 to 2; a saponification number of less than about 1; and an iodine value of about 75 to 100. The saponification number is a measure of the amount of acids, esters and anhydrides present, whereas the acid number is a measure of only the acid groups present. Examples of commercially available tackifying resins of this type are "Wingtack 95" sold by Goodyear Tire and Rubber Company.

Other suitable resins are the rosin ester resins and the terpene polymers such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, terpentine, a terpene cut or fraction, and various other terpenes. Particularly useful starting materials are terpene mixtures containing at least 20 percent beta-pinene and/or limonene or [dipentene] (racemic limonene), and the "sulfate turpentine" obtained as a by-product in the sulfate pulping process.

Preferred tackifying resins used in the hot-melt adhesive composition of the present invention have a ring and ball softening point of at least 85° C., preferably about 90° to 140° C., with a ring and ball softening point of about 130° C. being most preferred.

The composition according to the present invention contains about 5 to 20 weight percent of component (d), a high melting, low viscosity wax selected from the group consisting of high density polyethylene waxes, Fischer-Tropsch synthetic waxes, and microcrystalline waxes. A polyethylene wax is defined herein as a polyethylene having a Brookfield Thermosel viscosity at 150° C. of less than 500 centipoise, preferably less than 300 centipoise, and more preferably less than 100 centipoise. The amount of this wax in the hot-melt adhesive composition of the present invention is preferably about 10 to 20 weight percent, with a weight percent of about 15 to 20 being more preferred. Amounts of wax much below about 5 weight percent are not sufficient to impart short set time in the adhesive, whereas amounts much above about 20 weight percent adversely affect adhesion and bond aging.

The wax used in the hot-melt adhesive composition of the present invention is a high melting wax, meaning it has a ring and ball softening point of at least 80° C., preferably more than 100° C., more preferably more than 110° C. The high melting wax most preferably has a ring and ball softening point of about 114° C. A wax having a ring and ball softening point much below about 80° C. does not impart sufficient high temperature properties and makes the adhesive set too slowly.

The wax used in the hot-melt adhesive composition of the present invention is a low viscosity wax, preferably having a viscosity of about 4 to 500 centipoise at 150° C., more preferably about 10 to 400 centipoise at 150° C. with a viscosity of about 15 centipoise at 150° C. being most preferred. A wax having a viscosity much above about 500 centipoise at 150° C. yields adhesives too high in viscosity for high-speed packaging equipment.

A high density polyethylene wax is the more preferred wax used in the adhesive composition of the present invention and it preferably has a density between 0.93 and 0.97 g/cc, more preferably about 0.94 to 0.96 g/cc with a density of about 0.95 g/cc being most preferred. Polyethylene waxes having densities much below 0.93 are not practical. A suitable example of a high density polyethylene wax is Polyset 2015 available from International Group Incorporated (IGI).

The adhesive composition of the present invention is an advance in hot-melt adhesives due to its novel combination of good hot tack as well as a good combination of the other adhesive properties important for high speed packaging in a broad temperature range.

The preferred embodiment of the present hot-melt adhesive composition comprises a blend of about 5 to 20 weight percent component (a), about 25–55 weight percent component (b), about 20 to 35 weight percent component (c), and about 10 to 20 weight percent component (d). The preferred adhesive composition has performance property levels within the ranges which achieve the desired balance wherein all performance properties are good to excellent, not necessarily the very best performance level attainable for each individual property. The important performance properties are classified into ranges of performance levels (good, very good, and excellent) in the Examples that follow.

The most preferred embodiment of the present hot-melt adhesive composition comprises a blend of about 10 to 17 weight percent component (a), about 30 to 45 weight percent component (b), about 30 to 35 weight percent component (c), and about 15 to 20 weight percent component (d). This most preferred adhesive composition of the present invention has the following performance properties: an excellent set time of about 2.3 to 2.6 seconds, a very good hot tack rating of about 0.36 to 0.40 seconds, a good to excellent open time of about 7 to 13 seconds, very good low temperature bond performance demonstrated by a minimum fiber tear temperature of about (−18°) to (−29° C.), good elevated temperature bond performance demonstrated by an IOPP cleavage temperature of about 77° to 79° C., good bond aging characteristics on a variety of packaging substrates. The performance properties described above are further defined by the test methods used in the Examples that follow.

The hot-melt adhesive composition of the present invention has a density of no greater than 0.98 g/cc, preferably no greater than 0.96 g/cc, and more preferably no greater than 0.95 g/cc.

The adhesive composition has a molten stability up to a temperature of about 177° C. (350° F.). A composition is defined as having molten stability when the viscosity change is not more than 15 percent, preferably not more than 10 percent, and more preferably not more than 5 percent at about 177° C. (350° F.) after 100 hours, using ASTM-D-4499.

The hot-melt adhesive composition of the present invention has a relatively low melt viscosity of about 300 to 4,000 centipoise at 177° C. The hot-melt adhesive composition of the present invention, in order to be more useful in high-speed packaging applications, preferably has a melt viscosity no higher than 3,000 centipoise at 177° C., more preferably about 1,000 to 2,000 centipoise at 177° C. in order to achieve the most desired balance of all performance properties. At higher viscosities such as those near and above 4,000 centipoise, a hot-melt adhesive would exhibit stringing and other poor machining characteristics on high speed lines. Melt viscosities much below about 300 centipoise at 177° C. are not practical in that cohesive strength of the adhesive blend would be poor.

The adhesive compositions of this invention are preferably prepared by blending together the adhesive components in the melt at a temperature of about 160° C. to about 200° C. until a homogeneous mixture is obtained. Various methods of blending materials of this type are known in the art and any method that produces a homogeneous mixture is satisfactory. These components blend easily in the melt and a heated vessel equipped with a stirrer is all that is required. For example, a Cowles stirrer provides effective mixing for preparing these compositions.

In addition to the stated adhesive components, it is desirable for the adhesive compositions to contain about 0.1 to 1.5 weight percent of one or more antioxidants, preferably about 0.25 to 1.0 weight percent. Antioxidants that are effective include, for example, tris(di-t-butyl-p-hydroxybenzyl)-trimethyl-benzene (IONOX 330), alkylated bisphenol (Naugawhite), zinc dibutyl dithiocarbamate (Butyl Zimate), and 4,4'-methylene-bis-(2,6-di-tert-butylphenol) (ETHYL 702), tetrakis[methylene-3-(3',5'-di-t-butyl-4-hydroxyphenyl)-propionate]-methane (IRGANOX 1010 or NAUGARD 10), lauryl stearyl thiodipropionate (CYANOX 1212), and dilauryl 3,3'-thiodipropionate (CYANOX DLTDP sold by American Cyanamid) and 2,6-di-tert-butyl-p-cresol (BHT) and the like.

The hot-melt adhesive composition according to the present invention is generally applied to a substrate in packaging applications by being extruded onto the surface of a substrate, while in the melt phase, and then contacted with another surface which is a second substrate or second surface of the same substrate, such as a box flap. The present hot-melt adhesive composition is suitable for use with a variety of substrates, including but not limited to, paper, chipboard and corrugated board. This hot-melt adhesive composition is especially useful when applied to corrugated board stock for use in multipiece high spring back boxes.

The following examples are intended to illustrate the present invention but should not be interpreted as a limitation thereof.

EXAMPLES

The following general methods were used in the examples:

viscosity—ASTM D3236 set time—Waldorf set time open time—Waldorf set time

IOPP cleavage temperature—This test measures the ability of a 25 mg/cm bead of adhesive on corrugated kraftboard to support 60 g/cm of cleavage stress for 24 hours.

bond aging—Fiber tear test on high performance high recycle content boardstock at 120° F., performed after 2 weeks and again after 4 weeks. "Full" means a full fiber tear of 100% of bonded surfaces.

molten stability—ASTM D4499—Test was performed after 100 hours at 177° C. (350° F.) to show % viscosity change.

hot tack rating—This test measures the time (seconds) that would be expected to result in the bonds of 50% of all 25 mg/cm bead specimens of adhesive to fail. Bond failure was achieved when, after compression, a bond was not formed when two substrates, having a 25 mg/cm bead of adhesive in between them, were pulled apart, using 200 pound burst strength corrugated board as the substrate.

The performance levels of the adhesive properties tested in the examples were classified into the following ranges for convenience in interpreting the results of the examples and for clarity of use throughout this application. A set time less than 4 seconds is good, less than 3 seconds is very good, and less than 2.5 seconds is excellent. A hot tack rating of 0.45 seconds or less is good, 0.40 seconds or less is very good, and 0.35 seconds or less is excellent. An open time greater than 6 seconds is good, greater than 8 seconds is very good, and greater than 12 seconds is excellent. High temperature bonding performance shown by an IOPP cleavage temperature greater than 75° C. is good, greater than 80° C. is very good, and greater than 82° C. is excellent. Low temperature bonding performance shown by a minimum fiber tear temperature less than −10° C. is good, less than −20° C. is very good, and less than −30° C. is excellent. Good bond aging characteristics are shown by a full fiber tear on high performance high recycle content boardstock at 120° C. after two weeks and after four weeks.

The following components were used in the compositions for Examples 1–20:

1. component (a)—Exxon Exact 4038, from Exxon Chemical Company, a metallocene catalyzed plastomer copolymer of ethylene and about 22% by weight 1-butene, a melt index of about 125, a density of about 0.885 g/cc, and a molecular weight distribution of about 2.0.

2. component (b)—Epolene C-18, from Eastman Chemical Company. This is a maleated polyethylene that is formed from a polyethylene which has been polymerized under high pressure polymerization using a peroxide catalyst to give a molecular weight distribution of about 2.6 to 4.6 and then grafted with maleic anhydride, having a saponification number of about 5, a viscosity of about 4,000 centipoise at 150° C., a density of about 0.905 g/cc, and a ring and ball softening point of about 102° C.

3. component (c)—Eastotac H-130R, from Eastman Chemical Company, an essentially aliphatic hydrocarbon tackifying resin having a viscosity of about 1,200 centipoise at 190° C., a density of about 1.04 g/cc, and a ring and ball softening point of about 130° C.

4. component (d)—Polyset 2015, from International Group Incorporated (IGI), a polyethylene wax having a viscosity of about 15 centipoise at 150° C., a density of about 0.95 g/cc, and a ring and ball softening point of about 114° C.

5. NAUGARD 10—(tetrakis[methylene-3-(3',5'-di-t-butyl-4-hydroxyphenyl)-propionate]-methane), an antioxidant available from Uniroyal.

6. CYANOX 1212—lauryl stearyl thiodipropionate, an antioxidant available from American Cyanamid.

Examples 1–17

Examples 1–17 of the present invention were prepared by mixing the solid weighed components, melting them in containers placed in heating mantles, and stirring the blends for one hour at 200° C., under nitrogen purge.

The amounts of components in Examples 1–15 were chosen for the purpose of producing equations which would describe the properties tested and thereafter allow prediction of preferred composition formulations. Examples 16 and 17 were prepared with amounts of components that were predicted from Examples 1–15 to obtain embodiments having the most preferred combinations of viscosity, set time, open time, hot tack, IOPP cleavage time and minimum fiber tear temperature.

In addition to the components listed below in Table 1, Examples 1–17 contain antioxidants, 0.20 weight percent NAUGARD 10 and 0.70 weight percent CYANOX 1212. The various amounts of the remaining components used to formulate the compositions of Examples 1–17 are illustrated in Table 1.

TABLE 1

Formulations for Examples 1–17

| Example # | Component(a) Exxon Exact 4038 (weight %) | Component(b) Epolene C-18 (weight %) | Component (c) Eastotac H-130R (weight %) | Component(d) Polyset 2015 (weight %) |
| --- | --- | --- | --- | --- |
| 1 | 5.00 | 65.00 | 20.00 | 10.00 |
| 2 | 20.00 | 50.00 | 20.00 | 10.00 |
| 3 | 5.00 | 50.00 | 35.00 | 10.00 |
| 4 | 20.00 | 35.00 | 35.00 | 10.00 |

TABLE 1-continued

Formulations for Examples 1–17

| Example # | Component(a) Exxon Exact 4038 (weight %) | Component(b) Epolene C-18 (weight %) | Component (c) Eastotac H-130R (weight %) | Component(d) Polyset 2015 (weight %) |
|---|---|---|---|---|
| 5 | 5.00 | 55.00 | 20.00 | 20.00 |
| 6 | 20.00 | 40.00 | 20.00 | 20.00 |
| 7 | 5.00 | 40.00 | 35.00 | 20.00 |
| 8 | 20.00 | 25.00 | 35.00 | 20.00 |
| 9 | 5.00 | 52.50 | 27.50 | 15.00 |
| 10 | 20.00 | 37.50 | 27.50 | 15.00 |
| 11 | 12.50 | 52.50 | 20.00 | 15.00 |
| 12 | 12.50 | 37.50 | 35.00 | 15.00 |
| 13 | 12.50 | 50.00 | 27.50 | 10.00 |
| 14 | 12.50 | 40.00 | 27.50 | 20.00 |
| 15 | 12.50 | 45.00 | 27.50 | 15.00 |
| 16 | 11.1 | 40.9 | 30.2 | 17.8 |
| 17 | 16.5 | 33.3 | 34.9 | 15.3 |

The performance analysis of each of the above 17 example formulations is shown in Table 2.

TABLE 2

Performance Analysis for Examples 1–17

| Example | Viscosity @ 177° C. (350° F.), cps | Set Time, sec | Open Time, sec | H Tack Rating, sec | IOPP Cleavage Temp., C(F) | Min. Fiber Tear Temp., C(F) | Bond Aging @ 120° F., fiber tear | Molten Stability, % |
|---|---|---|---|---|---|---|---|---|
| 1 | 1313 | 3.9 | 5.6 | 0.65 | 79(175) | −45(<−51) | | |
| 2 | 3520 | 5.0 | 10.9 | 0.75 | 74(185) | −51(−60) | | |
| 3 | 978 | 2.2 | 6.7 | 0.35 | 85(185) | 4(40) | | |
| 4 | 2900 | 2.7 | 4.4 | 0.45 | 74(165) | −46(−51) | | |
| 5 | 840 | 3.8 | 5.4 | 0.41 | 82(180) | −51(−60) | | |
| 6 | 2420 | 6.2 | 6.2 | 0.52 | 85(185) | −51(−60) | | |
| 7 | 680 | 1.9 | 3.8 | 0.29 | 82(180) | 4(40) | | |
| 8 | 1885 | 2.3 | 7.3 | 0.34 | 77(170) | −46(−51) | | |
| 9 | 900 | 2.8 | 8.3 | 0.36 | 77(170) | −1(30) | | |
| 10 | 2750 | 3.3 | 7.3 | 0.41 | 74(165) | −51(−60) | | |
| 11 | 1800 | 5.6 | 6.4 | 0.52 | 82(180) | −46(−51) | | |
| 12 | 1365 | 2.4 | 11.5 | 0.33 | 82(180) | −10(14) | | |
| 13 | 1990 | 2.7 | 2.8 | 0.46 | 74(165) | −46(−51) | | |
| 14 | 1267 | 2.6 | 6.8 | 0.38 | 82(180) | −46(−51) | | |
| 15 | 1600 | 2.8 | 9.2 | 0.39 | 74(165) | −46(−51) | | |
| 16 | 1122 | 2.3 | 7.0 | 0.36 | 77(170) | −18(0) | 2w - full 4w - full | 5 |
| 17 | 1730 | 2.6 | 13.0 | 0.40 | 79(175) | −29(−18) | 2w - full 4w - full | 5 |

Analysis of Table 2 shows that Eaxmple 6 displayed the best high and low temperature bonding strength, evidenced by an IOPP cleavage temperature of 85° C. and a minimum fiber tear temperature of −51° C. However, Example 6 also displayed the worst (longest) set time. Example 7 displayed the best set time, viscosity, and hot tack. However, Example 7 also had a poor (short) open time of only 3.8 seconds.

The properties of Examples 16 and 17, as shown above in Table 2, were the most desirable combination of properties for high speed packaging adhesives. The individual properties of Examples 16 and 17 were not necessarily the best, although Example 17 does show the best (longest) open time, but were rather the best combination wherein all properties are good to excellent. Example 16 provides very good hot tack and excellent set time properties while still maintaining good elevated temperature properties (high IOPP cleavage temperature), good low temperature properties (low minimum fiber tear temperature), and relatively low viscosity. Example 17 provides excellent open time and set time while maintaining very good hot tack and low temperature properties and good elevated temperature properties.

Examples 18–20

Examples 16 and 17, the most preferred embodiments of the present composition, were compared to Examples 18–20, three commercially available adhesives commonly used in the adhesives industry, each containing components (b), (c), and (d).

Example 18 is a commercially available typical low temperature formula adhesive having amounts of components (b), (c), and (d) and antioxidants substantially similar to Example 1, except containing a different but similar polyethylene wax for component (d), having no presence of component (a), and having no other compounds present other than components (b) and (c). This adhesive generally has a melt viscosity of 1100 centipoise at 177° C. (350° F.) and a density of 0.94 g/cc.

Example 19 is a commercially available typical fast set formula adhesive having amounts of components (b) (c), and (d) and antioxidants substantially similar to Example 3, except containing a different but similar polyethylene wax for component (d), having no presence of component (a), and having no other compounds present other than components (b) and (c). This adhesive generally has a melt viscosity of 900 centipoise at 177° C. (350° F.) and a density of 0.95 g/cc.

Example 20 is a commercially available typical high performance board formula adhesive having amounts of components (b), (c), and (d) and antioxidants substantially similar to Example 11, having no presence of component (a), and having no other compounds present other than components (b) and (c) and an ethylene-alkyl acrylate copolymer as disclosed in U.S. Pat. No. 5,382,615. This adhesive generally has a melt viscosity of 900 centipoise at 177° C. (350° F.) and a density of 0.94 g/cc.

TABLE 3

Comparison of Preferred Formulations of
Adhesive Composition to Typical Commercial Adhesives

| Example | Viscosity @ 177° C. (350° F.) cps | Ring & Ball Softening Point, °C. | Set Time sec | Open Time sec | Hot Tack Rating sec | IOPP Cleavage Temp. °C.(F.) | Min. Fiber Tear Temp. °C.(F.) | Density g/cc |
|---|---|---|---|---|---|---|---|---|
| 16 | 1122 | 103 | 2.3 | 7.0 | 0.36 | 77(170) | −18(0) | 0.94 |
| 17 | 1730 | 102 | 2.6 | 13.0 | 0.40 | 79(175) | −29(−18) | 0.95 |
| 18 (Typical Low Temperature Formula) | 1100 | 110 | 5.0 | 4.0 | 0.96 | 68(155) | −21(−6) | 0.94 |
| 19 (Typical Fast Set Formula) | 900 | 109 | 3.5 | 15.0 | 0.56 | 74(165) | −1(30) | 0.95 |
| 20 (Typical High Performance Board Formula) | 900 | 104 | 3.0 | 6.0 | 0.49 | 79(175) | <−34 (<−30) | 0.94 |

All of the properties analyzed for Examples 16 and 17 were good to excellent. However while Example 18, the typical low temperature formula, showed very good low temperature properties, it also showed only fair set time, only fair hot tack, poor elevated temperature bonding, and a poor open time. Example 19, the typical fast set formula, showed moderate to excellent properties except for low temperature bonding, which was poor. Example 20, the typical high performance board formula, showed good elevated and excellent low temperature bonding, good set time, and moderate hot tack and open time. All properties analyzed for Examples 16 and 17 were good to excellent.

This comparison shows that the most preferred embodiment of the present adhesive composition, which includes component (a), in addition to components (b), (c) and (d) has a significantly better overall combination of adhesive properties than do similar compositions having no component (a).

I claim:

1. A hot-melt adhesive composition comprising a blend of:
   (a) about 3 to 50 weight percent of a linear polymer of ethylene and at least one other alpha-olefin having from 3 to 12 carbons, said polymer having a polydispersity index of less than 2.5 and a density of less than about 0.915 g/cc;
   (b) about 5 to 77 weight percent of a polyethylene graft copolymer having a saponifiction number of about 3 to 60 that is grafted with an unsaturated polycarboxylic acid, anhydride, or ester, thereof;
   (c) about 15 to 45 weight percent of a tackifying resin selected from the group consisting of essentially aliphatic hydrocarbon resins, polyterpene resins, and rosin ester resins; and
   (d) about 5 to 20 weight percent of a high melting, low viscosity wax selected from the group consisting of high density polyethylene waxes, Fisher-Tropsch synthetic waxes, and microcrystalline waxes.

2. The composition according to claim 1 wherein the amounts of the components of the blend are about 5 to 20 weight percent (a), about 25 to 55 weight percent (b), and about 20 to 35 weight percent (c), and about 10 to 20 weight percent (d).

3. The composition according to claim 2 wherein the amount of the ethylene copolymer of (a) is about 11 to 17 weight percent.

4. The composition according to claim 1 wherein the ethylene copolymer of (a) has a melt index of about 100 to 500 g/10 min at 190° C.

5. The composition according to claim 1 wherein the ethylene copolymer of (a) is a copolymer of ethylene and 1-butene.

6. The composition according to claim 1 wherein the ethylene copolymer of (a) has a concentration of about 8 to 30 weight percent of the other alpha-olefin.

7. The composition according to claim 6 wherein the ethylene copolymer of (a) has a concentration of about 15 to 25 weight percent of the other alpha-olefin.

8. The composition according to claim 2 wherein the polyethylene graft copolymer of (b) is present in the amount of about 30 to 45 weight percent.

9. The composition according to claim 1 wherein the polyethylene graft copolymer of (b) has a saponification number of about 3 to 10.

10. The composition according to claim 1 wherein the polyethylene graft copolymer of (b) has a viscosity of about 350 to 15,000 centipoise at 150° C.

11. The composition according to claim 1 wherein the polyethylene graft copolymer of (b) has a melt index of about 100 to 5,000 at 190° C.

12. The composition according to claim 1 wherein the polyethylene graft copolymer of (b) is a maleated polyethylene.

13. The composition according to claim 2 wherein the tackifying resin of (c) is present in a concentration of about 30 to 35 weight percent.

14. The composition according to claim 1 wherein the tackifying resin of (c) has a ring and ball softening point of about 900° to 140° C.

15. The composition according to claim 1 wherein the tackifying resin of (c) is an essentially aliphatic hydrocarbon resin.

16. The composition according to claim 2 wherein the concentration of the wax of (d) is about 15 to 20 weight percent.

17. The composition according to claim 1 wherein the wax of (d) has a ring and ball softening point of at least 80° C.

18. The composition according to claim 1 wherein the wax of (d) is a high density polyethylene wax.

19. The composition according to claim 18 wherein the high density polyethylene wax has a density of about 0.94 to 0.96 g/cc.

20. The composition according to claim 1 wherein the composition has a melt viscosity of about 1,000 to 2,000 centipoise at 177° C. (350° F.).

21. The composition according to claim 2 wherein the amounts of the components of the blend are about 10 to 17 weight percent (a), about 30 to 45 weight percent (b), about 30 to 35 weight percent (c), and about 15 to 20 weight percent (d).

22. The composition of claim 21 wherein the adhesive composition has a set time of about 2.3 to 2.6 seconds, a hot tack rating of about 0.36 to 0.40 seconds, an open time of about 7 to 13 seconds, an IOPP cleavage temperature of about 77° to 79° C., a minimum fiber tear temperature of about (−18°) to (−29° C.), a density not greater than 0.98 g/cc, a melt viscosity between about 300 to 4,000 centipoise at 177° C. (350° F.), good bond aging characteristics as measured by full fiber tear on high performance high recycle content boardstock at 120° F. (about 49° C.) aftr 2 weeks and after 4 weeks, and a molten stability up to about 190° C.

23. The composition according to claim 1 wherein the ethylene polymer (a) has a melt index of about 70 to 1,000 g/cc at 190° C.

24. The composition according to claim 1 wherein the composition has a melt viscosity of about 300 to 4,000 centipoise at 177° C. (350° F.).

25. A hot-melt adhesive composition comprising a blend of:
(a) about 3 to 50 weight percent of a linear polymer of ethylene and at least one other alpha-olefin having from 3 to 12 carbons, said polymer having an alpha olefin concentration from about 8 to 30 weight percent of the polymer and a density of less than about 0.915 g/cc;
(b) about 5 to 77 weight percent of a polyethylene graft copolymer having a saponification number of bout 3 to 60 that is grated with an unsaturated polycarboxylic acid, anhydride, or ester, thereof;
(c) about 15 to 45 weight percent of a tackifying resin selected from the group consisting of essentially aliphatic hydrocarbon resins polyterpene resins, and rosin ester resins; and
(d) about 5 to 20 eight percent of a high melting, low viscosity wax selected from the group consisting of high density polyethylene waxes, Fischer-Tropsch synthetic waxes, and microcystalline waxes.

26. The composition of claim 25 wherein the ethylene polymer has density of less than about 0.90 g/cc.

27. The composition of claim 25 wherein the ethylene polymer has a melt index from about 70 to 1,000 g/10 min. at 190 ° C.

28. The composition of claim 25 wherein the ethylene polymer has a melt index from about 100 to about 500 g/10 min. at 190° C.

29. The composition of claim 25 wherein the polyethylene graft copolymer has a viscosity of about 350 to 15,000 centipoise at 150° C.

30. The composition of claim 25 wherein the polyethylene graft copolymer has a melt index of about 100 to 5,000 g/10 min. at 190° C.

31. The composition of claim 25 wherein the polethylene graft copolymer is a maleated polyethylene.

32. The composition of claim 25 wherein the wax has a ring and ball softening point of at least 80° C.

33. The composition of claim 25 wherein the composition has a melt viscosity of about 100 to about 4,000centipoise at 177° C. (350° F.).

34. The composition of claim 25 wherein the amounts of the components of the blend are about 5 to 20 weight percent (a), about 25 to 55 weight percent (b) about 20 to 35 weight percent (c) and about 10 to 20 weight percent (d).

* * * * *